(12) United States Patent
Yamamoto

(10) Patent No.: US 7,620,771 B2
(45) Date of Patent: Nov. 17, 2009

(54) MAGNETIC DISK APPARATUS, METHOD FOR ADJUSTING PERFORMANCE OF MAGNETIC DISK APPARATUS, AND METHOD FOR ACCESSING MAGNETIC DISK

(75) Inventor: Michio Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 874 days.

(21) Appl. No.: 11/190,709

(22) Filed: Jul. 27, 2005

(65) Prior Publication Data
US 2006/0215294 A1    Sep. 28, 2006

(30) Foreign Application Priority Data
Mar. 22, 2005    (JP)    ............... 2005-080800

(51) Int. Cl.
*G06F 12/00*    (2006.01)
(52) U.S. Cl. ..................................... 711/112
(58) Field of Classification Search ............... None
See application file for complete search history.

(56) References Cited
U.S. PATENT DOCUMENTS 5,596,458 A    1/1997    Emo et al.
5,870,237 A    2/1999    Emo et al.
5,946,153 A    8/1999    Emo et al.
6,005,725 A    12/1999    Emo et al.
6,061,195 A    5/2000    Emo et al.
6,091,559 A    7/2000    Emo et al.
6,260,257 B1    7/2001    Emo et al.

FOREIGN PATENT DOCUMENTS

JP    8-255412    10/1996

*Primary Examiner*—Hiep T Nguyen
(74) *Attorney, Agent, or Firm*—Greer, Burns & Crain, Ltd.

(57) ABSTRACT

A magnetic disk apparatus includes an input unit that inputs information on the number of sectors, which should be included in each cell, defined as performance adjusting information, a calculating unit that calculates, for each cell, the number of sectors included in the cell on the basis of constitution information of cells, a setting unit that sets, for each cell, sectors as many as a number, which is equivalent to a difference between the calculated number of sectors and the inputted number of sectors, as unused sectors. In the present invention, the magnetic disk apparatus adjusts the number of sectors included in each cell of the own device to the number of sectors defined in the performance adjusting information. Thus, even when a plurality of the magnetic disk apparatuses are manufactured, the numbers of sectors of cells are adjusted to the number of sectors defined in the performance adjusting information to make the numbers of cells identical. Consequently, uniformalization of data access times can be realized.

17 Claims, 14 Drawing Sheets

| ZONE NUMBER | NUMBER OF SECTORS THAT SHOULD BE INCLUDED IN EACH CELL BELONGING TO ZONE |
|---|---|
| 0 | 10000 |
| 1 | 9800 |
| 2 | 9600 |
| 3 | 9400 |
| ⋮ | ⋮ |
| M | 8000 |

FIG. 4

| NUMBER OF ZONE TO WHICH CELLS BELONG | HEAD NUMBER | NUMBER OF CYLINDERS | NUMBER OF SECTORS/TRACK |
|---|---|---|---|
| 0 | 0 | $p_{0,0}$ | $r_{0,0}$ |
| | 1 | $p_{0,1}$ | $r_{0,1}$ |
| | ⋮ | ⋮ | ⋮ |
| | q | $p_{0,q}$ | $r_{0,9}$ |
| 1 | 0 | $p_{1,0}$ | $r_{1,0}$ |
| | 1 | $p_{1,1}$ | $r_{1,1}$ |
| | ⋮ | ⋮ | ⋮ |
| | q | $p_{1,q}$ | $r_{1,q}$ |
| ⋮ | ⋮ | ⋮ | ⋮ |
| M | 0 | $p_{MAX,0}$ | $r_{MAX,0}$ |
| | 1 | $p_{MAX,1}$ | $r_{MAX,1}$ |
| | ⋮ | ⋮ | ⋮ |
| | q | $p_{MAX,q}$ | $r_{MAX,q}$ |

FIG. 5

| ZONE NUMBER | NUMBER OF CELLS BELONGING TO ZONE |
|---|---|
| 0 | 100 |
| 1 | 100 |
| 2 | 100 |
| 3 | 100 |
| ⋮ | ⋮ |
| M | 100 |

FIG. 6

| ZONE NUMBER | NUMBER OF SECTORS OF EACH CELL BELONGING TO ZONE |
|---|---|
| 0 | 11000 |
| 1 | 10700 |
| 2 | 10400 |
| 3 | 10100 |
| ⋮ | ⋮ |
| M | 8200 |

| ZONE NUMBER | NUMBER OF GAPS INCLUDED IN CELLS BELONGING TO ZONE |
|---|---|
| 0 | 1000 |
| 1 | 900 |
| 2 | 800 |
| 3 | 700 |
| ⋮ | ⋮ |
| M | 200 |

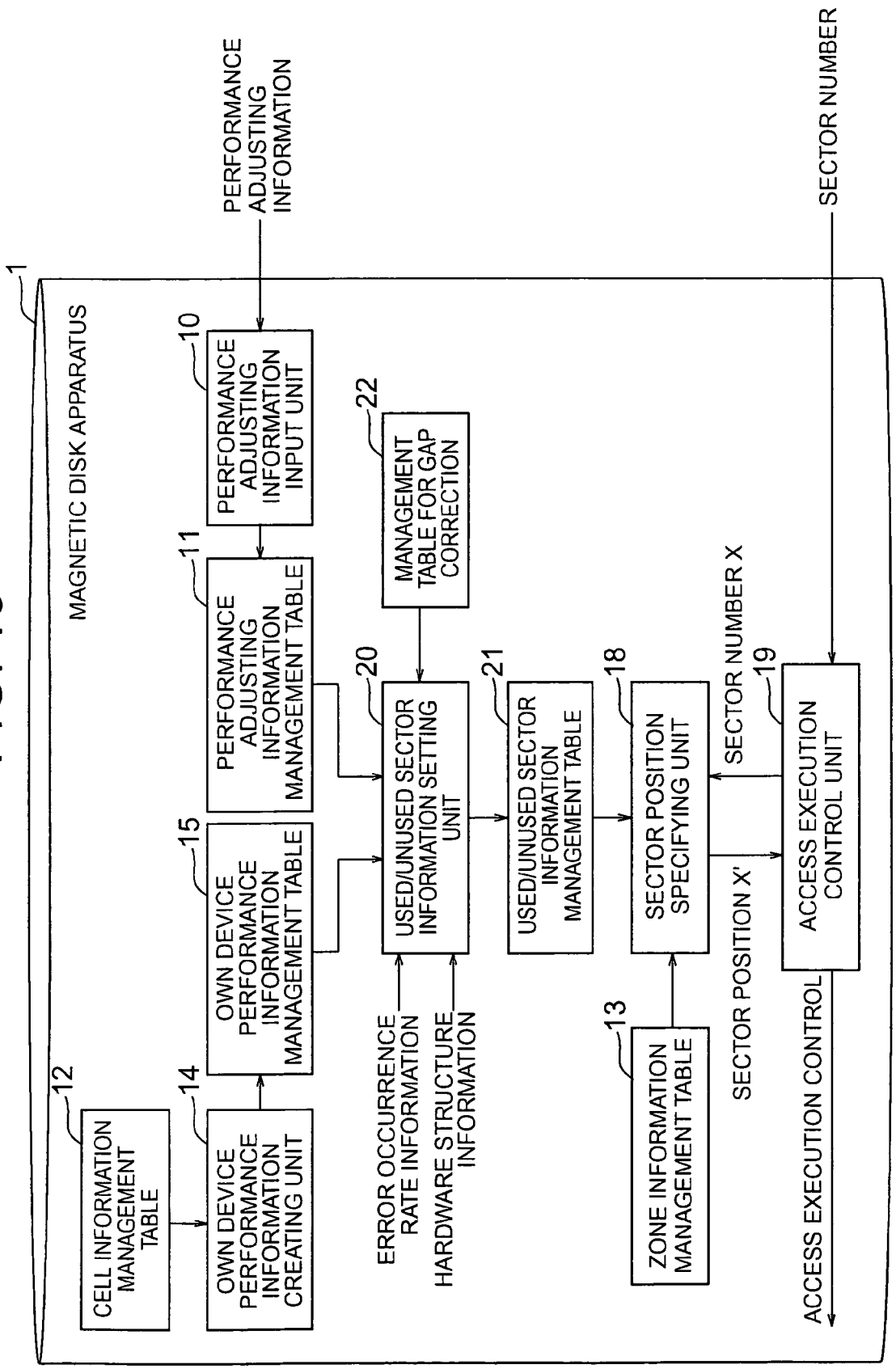

FIG. 14A

| ACCESS ERROR OCCURRENCE RATE | ADDED AMOUNT OF USED SECTOR |
|---|---|
| 0~eee | 3% |
| eee~fff | 4% |
| fff~ggg | 5% |
| ⋮ | ⋮ |

FIG. 14B

| NUMBER OF HEADS | ADDED AMOUNT OF USED SECTOR |
|---|---|
| Q | 0% |
| (Q-1) | 2% |
| (Q-2) | 2% |
| (Q-3) | 4% |
| (Q-4) | 4% |
| ⋮ | ⋮ |

FIG. 15

| ZONE NUMBER | BREAKDOWN OF NUMBER OF SECTORS INCLUDED IN CELLS BELONGING TO ZONE ||
|---|---|---|
| | NUMBER OF USED SECTORS | NUMBER OF UNUSED SECTORS |
| 0 | 10050 | 950 |
| 1 | 9850 | 850 |
| 2 | 9640 | 760 |
| 3 | 9440 | 660 |
| ⋮ | ⋮ | ⋮ |
| M | 8210 | 190 |

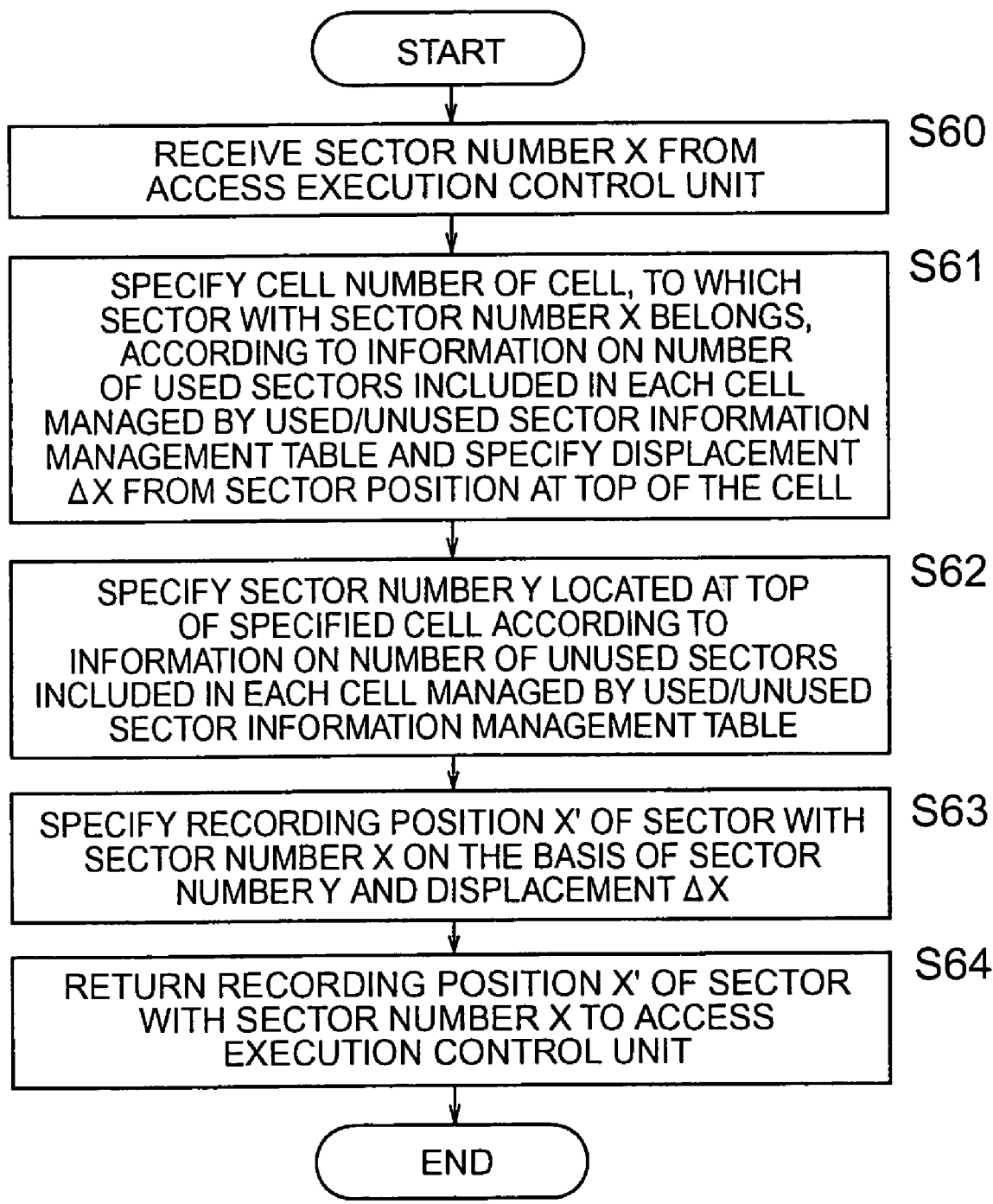

MAGNETIC DISK APPARATUS, METHOD FOR ADJUSTING PERFORMANCE OF MAGNETIC DISK APPARATUS, AND METHOD FOR ACCESSING MAGNETIC DISK

CROSS-REFERENCE TO RELATED APPLICATIONS

This application claims the conventional priority based on Japanese Patent Application Serial No. 2005-080800, filed on Mar. 22, 2005, the disclosures of which are incorporated herein by reference.

BACKGROUND OF THE INVENTION

1. Field of the Invention

This invention generally relates a magnetic disk apparatus, a method for adjusting performance of the magnetic disk apparatus, and a method for accessing a magnetic disk, and more particularly to a magnetic disk apparatus performance adjusting method that is executed by magnetic disk apparatuses, which can change the number of sectors included in each cell set on a magnetic disk, to realize uniformalization of data access times of the magnetic disk apparatuses, a magnetic disk apparatus that executes the method for adjusting magnetic disk apparatus performance, a method for accessing a magnetic disk that is executed on a magnetic disk apparatus whose performance is adjusted by method for adjusting the magnetic disk apparatus performance, and a magnetic disk apparatus that executes the method for accessing a magnetic disk.

2. Description of the Related Art

Data access by a magnetic disk apparatus is executed with an address using a Logical Block Addressing (LBA) format that is a system for attaching logical numbers to all sectors (a sector is a unit of data recording and reproduction). A method for allocating LBA differs depending on a magnetic disk apparatus. Usually, the method for allocating LBA realizing high access efficiency is adopted.

When a storage capacity of the magnetic disk apparatus used for data access in such a form increases, it is inevitable that yield of manufacturing thereof falls.

Under such circumstances, a recent magnetic disk apparatus adopts a method of securing a storage capacity as the whole device (a storage capacity guaranteed as a standard of a product) by setting an optimum track per inch (TPI) and an optimum bit per inch (BPI) for each head.

In other words, the TPI and the BPI are reduced for low-performance heads and, in order to secure a storage capacity decreased by the reduction in the TPI and the BPI, the TPI and the BPI for high-performance heads are increased to secure a storage capacity as the device as a whole.

A method of not using defective heads and defective cylinders to obtain a magnetic disk apparatus with a small storage capacity is also used.

It is assumed that there is a magnetic disk apparatus which should be originally manufactured with a storage capacity of 100 gigabytes, but has a defect in a part of heads. The magnetic disk apparatus cannot realize the storage capacity of 100 gigabytes due to the defect. However, in a case that the storage capacity of 50 gigabytes can be realized, the magnetic disk apparatus is manufactured as a magnetic disk apparatus with a storage capacity of 50 gigabytes.

As a technique related to the invention, Japanese Patent Laid-Open No. 8-255412 discloses an invention concerning an adaptive zone recording method. According to the method, recording zone boundaries are set individually on the basis of actual measurements of performance of respective transducers (transducers for readout and writing), instead of setting recording zone boundaries simultaneously for all recording surfaces in advance on the basis of estimated characteristic values of heads.

When the method of making storage capacities identical in all magnetic disk apparatuses by adjusting TPIs and BPIs is used, it is possible to manufacture magnetic disk apparatuses having an identical storage capacity. However, since a position of LBA differs because of differences of the TPIs and the BPIs, seek times of heads are different. As a result, random access performances are not identical.

For example, whereas it is possible to perform data access with a seek amount of a certain value in a certain magnetic disk apparatus, a seek amount larger than that value is required in another magnetic disk apparatus. Thus, random access performances are not identical.

When the method of obtaining a magnetic disk apparatus with a small storage capacity by not using defective heads and the like is used, a hardware structure of heads of the magnetic disk apparatus is different from that of a magnetic disk apparatus that is originally manufactured with a small storage capacity. Thus, seek times of heads are different and random access performances are not identical.

For example, in an apparatus that is originally manufactured as a magnetic disk apparatus with a storage capacity of 50 gigabytes, it is possible to perform data access with a seek time of a certain value. On the other hand, in an apparatus that is manufactured as a magnetic disk apparatus with a storage capacity of 50 gigabytes by not using defective heads included in a magnetic disk apparatus with a storage capacity of 100 gigabytes, since weight of heads increases, a seek time larger than that value is required. As a result, random access performances are not identical.

SUMMARY OF THE INVENTION

The present invention has been devised in view of such circumstances and, it is an object of the present invention to provide a new technique for adjusting magnetic disk apparatus performance that, when magnetic disk apparatuses that can change the number of sectors included in each sector provided on a magnetic disk are manufactured, makes it possible to realize uniformalization of data access times of the magnetic disk apparatuses and provide a new magnetic disk access technique for performing data access in a magnetic disk apparatus whose performance is adjusted by the technique for adjusting magnetic disk apparatus performance.

[1] Structure for Realizing Uniformalization of Data Access Times of Magnetic Disk Apparatuses In manufacturing magnetic disk apparatuses that can change the number of sectors included in each cell set on a magnetic disk, in order to realize uniformalization of data access times of the magnetic disk apparatuses, a magnetic disk apparatus of the invention includes (1) an input unit that inputs information on the number of sectors, which should be included in each cell, defined as performance adjusting information, (2) a calculating unit that calculates, for each cell, the number of sectors included in the cell on the basis of structure information of cells, (3) a setting unit that sets sectors as many as a number, which is equivalent to a difference between the number of sectors calculated by the calculating unit and the number of sectors inputted by the input unit, as unused sectors.

The magnetic disk apparatus comprised in this way may include acquiring unit that performs processing for acquiring, according to an error occurrence rate of magnetic disk access obtained by an evaluation test for the apparatus, information on an added number of sectors that is defined in association with the error occurrence rate and acquiring, according to a structure of hardware used for the magnetic disk access, information on an added number of sectors that is defined in association with the hardware structure. When this acquiring unit is included in the magnetic disk apparatus, the setting unit may set sectors, which are not to be used, to reduce the difference according to the information on the added number of sectors acquired by the acquiring unit.

The respective processing unit included in the magnetic disk apparatus of the present invention can also be realized by a computer program. This computer program is recorded in an appropriate computer readable recording medium and provided or is provided via a network. When the invention is carried out, the computer program is installed and operates on control unit such as a CPU to thereby realize the present invention.

The magnetic disk apparatus of the present invention comprised in this way inputs information on the number of sectors, which should be included in each cell, defined as performance adjusting information.

For each cell, the magnetic disk apparatus calculates the number of sectors included in the cell on the basis of structure information of cells describing the number of cylinders for each magnetic head and the number of sectors per track.

As described above, the magnetic disk apparatus inputs the number of sectors, which should be included in each cell, defined as performance adjusting information and calculates the number of sectors actually included in each cell of the own device. Subsequently, for each cell, the magnetic disk apparatus sets sectors as many as a number, which is equivalent to a difference between the calculated number of sectors and the inputted number of sectors, as unused sectors to thereby forcibly set the number of sectors included in each cell of the own device as the number of sectors defined in the information adjusting information.

In this case, when the unused sectors are arranged in the cell in a distributed manner, control for data access is complicated. Thus, the magnetic disk apparatus sets the sectors of the number equivalent to the difference as unused sectors in order from a sector located at the end of sectors belonging to each cell or a sector located at the top of the sectors.

As described above, the magnetic disk apparatus of the present invention adjusts the number of sectors included in each cell of the own device uniformly to the number of sectors defined in the performance adjusting information. Thus, even when a plurality of the magnetic disk apparatuses of the present invention having the same storage capacity as specifications are manufactured, in the magnetic disk apparatuses, the numbers of sectors of cells are adjusted to the number of sectors defined in the performance adjusting information to make the numbers of cells identical. Consequently, uniformalization of data access times can be realized.

When this structure is adopted, in order to further make it possible to realize uniformalization of data access times taking into account a difference of error occurrence rates of magnetic disk access, the magnetic disk apparatus of the present invention may acquire, according to an error occurrence rate of magnetic disk access obtained by an evaluation test for the apparatus, information on an added number of sectors, which is defined in association with the error occurrence rate, and set sectors, which are not to be used, to reduce the difference between the calculated number of sectors and the inputted number of sectors according to the acquired information on an added number of sectors. In this case, when an error occurrence rate for each cell is obtained, the magnetic disk apparatus may change the number of sectors, which are set as unused sectors, for each cell according to the error occurrence rate.

According to this structure, when an error occurrence rate of magnetic disk access is large, it is possible to reduce the number of cells by increasing the number of sectors included in each cell of the own device to thereby reduce a seek amount. This makes it possible to restrain an increase in seek time based on an increase of the number of times of seek due to a large access error occurrence rate to realize uniformalization of data access times.

When this structure is adopted, in order to further realize uniformalization of data access times taking into account a difference of structures of hardware used for magnetic disk access, the magnetic disk apparatus of the present invention may acquire, according to a structure of hardware used for magnetic disk access, an added number of sectors defined in association with the hardware structure and set sectors, which are not to be used, to reduce the difference between the calculated number of sectors and the inputted number of sectors according to the acquired information on the number of added sectors.

According to this structure, for example, when the magnetic disk apparatus is manufactured as an apparatus with a small storage capacity while defective magnetic heads are implemented thereon, magnetic heads are heavier than those in the original device that is manufactured as a device with a small storage capacity. Thus, the number of cells is reduced by increasing the number of sectors included in each cell of the own device to reduce a seek amount. This makes it possible to restrain an increase in seek time based on an increase in seek movement speed due to the heavy head and realize uniformalization of data access times.

[2] Structure for Realizing Data Access with the Magnetic Disk Apparatus of the Present Invention whose Performance is Adjusted by the Technique of the Present Invention for Adjusting Magnetic Disk Apparatus Performance

[2-1] First Structure

When performance of the magnetic disk apparatus of the present invention is adjusted by the technique of the present invention for adjusting magnetic disk apparatus performance according to performance adjusting information such that each cell includes unused sectors, in order to realize data access to sectors in a state of use, the magnetic disk apparatus of the present invention includes (1) first storing unit that stores information on the number of sectors, which should be included in each cell, defined as performance adjusting information; (2) second storing unit that stores information on the number of unused sectors included in each cell that is determined according to the number of sectors defined by the performance adjusting information, (3) input unit that inputs a sector number designated by an access request, and (4) specifying unit that specifies, on the basis of the information stored by the first and the second storing unit, in which recording position a sector indicated by the sector number inputted by the input unit is located.

The second storing unit stores information on the number of unused sectors included in each cell that are set as unused sectors in order from a sector located at the end of sectors belonging to each cell or a sector located at the top of the sectors.

The respective processing unit included in the magnetic disk apparatus of the present invention except the first and the second storing unit can also be realized by a computer program. This computer program is recorded in an appropriate computer readable recording medium and provided or is provided via a network. When the present invention is carried out, the computer program is installed and operates on control unit such as a CPU to thereby realize the present invention.

When data access is requested designating a sector number, the magnetic disk apparatus of the present invention inputs the sector number designated by the access request.

The magnetic disk apparatus specifies a cell, to which a sector indicated by the inputted sector number belongs, and a sector position in the cell on the basis of the information stored by the first storing unit.

Subsequently, the magnetic disk apparatus specifies a number (defined in serial numbers including numbers of unused sectors) of a sector located at the top of the specified cell on the basis of the information stored by the second storing unit and information on the position of the specified cell. The magnetic disk apparatus specifies, on the basis of the specified number of the sector and the sector position in the cell specified earlier, in which recording position the sector indicated by the inputted sector number is located.

In this way, performance of the magnetic disk apparatus of the present invention is adjusted by the technique of the present invention for adjusting magnetic disk apparatus performance. When data access is requested designating a sector number, the magnetic disk apparatus specifies in which recording position a sector indicated by the sector number is located taking into account sectors to be set as unused sectors. Consequently, the magnetic disk apparatus can execute the requested data access.

[2-2] Second Structure

When performance of the magnetic disk apparatus of the present invention is adjusted by the technique of the present invention for adjusting magnetic disk apparatus performance according to performance adjusting information such that each cell includes unused sectors, in order to realize data access to sectors in a state of use, the magnetic disk apparatus of the present invention includes (1) storing unit that stores information on the number of used sectors, which are included in each cell, determined on the basis of performance adjusting information defining the number of sectors that should be included in each cell and information on the number of unused sectors included in each cell determined according to the number of used sectors, (2) input unit that inputs a sector number designated by an access request, and (3) specifying unit that specifies in which recording position a sector indicated by the sector number inputted by the input unit is located.

The number of used sectors stored by the storing unit may be set as the same value as the number of sectors defined in the performance adjusting information. The number of used sectors may also be set as a value larger than the number of sectors defined in the performance adjusting information because of an error occurrence rate of magnetic disk access, a difference of a structure of hardware used for the magnetic disk access, and the like.

The storing unit stores information on the number of unused sectors included in each cell that are set as unused sectors in order from a sector located at the end of sectors belonging to each cell or from a sector located at the top of the sectors.

The respective processing unit included in the magnetic disk apparatus of the invention except the storing unit can also be realized by a computer program. This computer program is recorded in an appropriate computer readable recording medium and provided or is provided via a network. When the invention is carried out, the computer program is installed and operates on control unit such as a CPU to thereby realize the invention.

When data access is requested designating a sector number, the magnetic disk apparatus of the invention inputs the sector number designated by the access request.

The magnetic disk apparatus specifies a cell, to which a sector indicated by the inputted sector number belongs, and a sector position in the cell on the basis of the information on the number of used sectors, which are included in each cell, stored by the storing unit.

Subsequently, the magnetic disk apparatus specifies a number (defined in serial numbers including numbers of unused sectors) of a sector located at the top of the specified cell on the basis of the information on the number of unused sectors, which are included in each cell, stored by the storing unit and information on how many cells have been specified before the cell. The magnetic disk apparatus specifies, on the basis of the specified number of the sector and the sector position in the cell specified earlier, in which recording position the sector indicated by the inputted sector number is located.

In this way, performance of the magnetic disk apparatus of the invention is adjusted by the magnetic disk apparatus performance adjusting technique of the invention. When data access is requested designating a sector number, the magnetic disk apparatus specifies in which recording position a sector indicated by the sector number is located taking into account sectors to be set as unused sectors. Consequently, the magnetic disk apparatus can execute the requested data access.

According to the present invention, when a plurality of the magnetic disk apparatuses of the present invention are manufactured, it is possible to uniformalize data access times among the magnetic disk apparatuses.

According to the present invention, even when error occurrence rates of magnetic disk access are different, it is possible to realize uniformalization of data access times. In addition, even when structures of hardware used for the magnetic disk access are different, it is possible to realize uniformalization of data access times.

According to the present invention, in the case in which performance of the magnetic disk apparatus of the present invention is adjusted by the technique of the present invention for adjusting magnetic disk apparatus performance, when data access is requested designating a sector number, it is possible to specify in which recording position a sector indicated by the sector number is located taking into account sectors to be set as unused sectors. Consequently, it is possible to execute the requested data access.

BRIEF DESCRIPTION OF THE DRAWINGS

FIG. 4 is a diagram for explaining information managed by a cell information management table.

FIG. 5 is a diagram for explaining information managed by a zone information management table.

FIG. 6 is a diagram for explaining information managed by an own device performance information management table.

FIG. 13 is an another embodiment of a magnetic disk apparatus according to the present invention.

FIGS. 14A and 14B are diagrams for explaining information managed by a management table for gap correction.

FIG. 15 is a diagram for explaining information managed by a used/unused sector information management table.

FIG. 17 is a flowchart of a processing flow executed by a sector position specifying unit.

DETAILED DESCRIPTION OF THE PREFERRED EMBODIMENTS

Embodiments of the invention will be hereinafter explained in detail.

[1] First Embodiment

Figure 1:
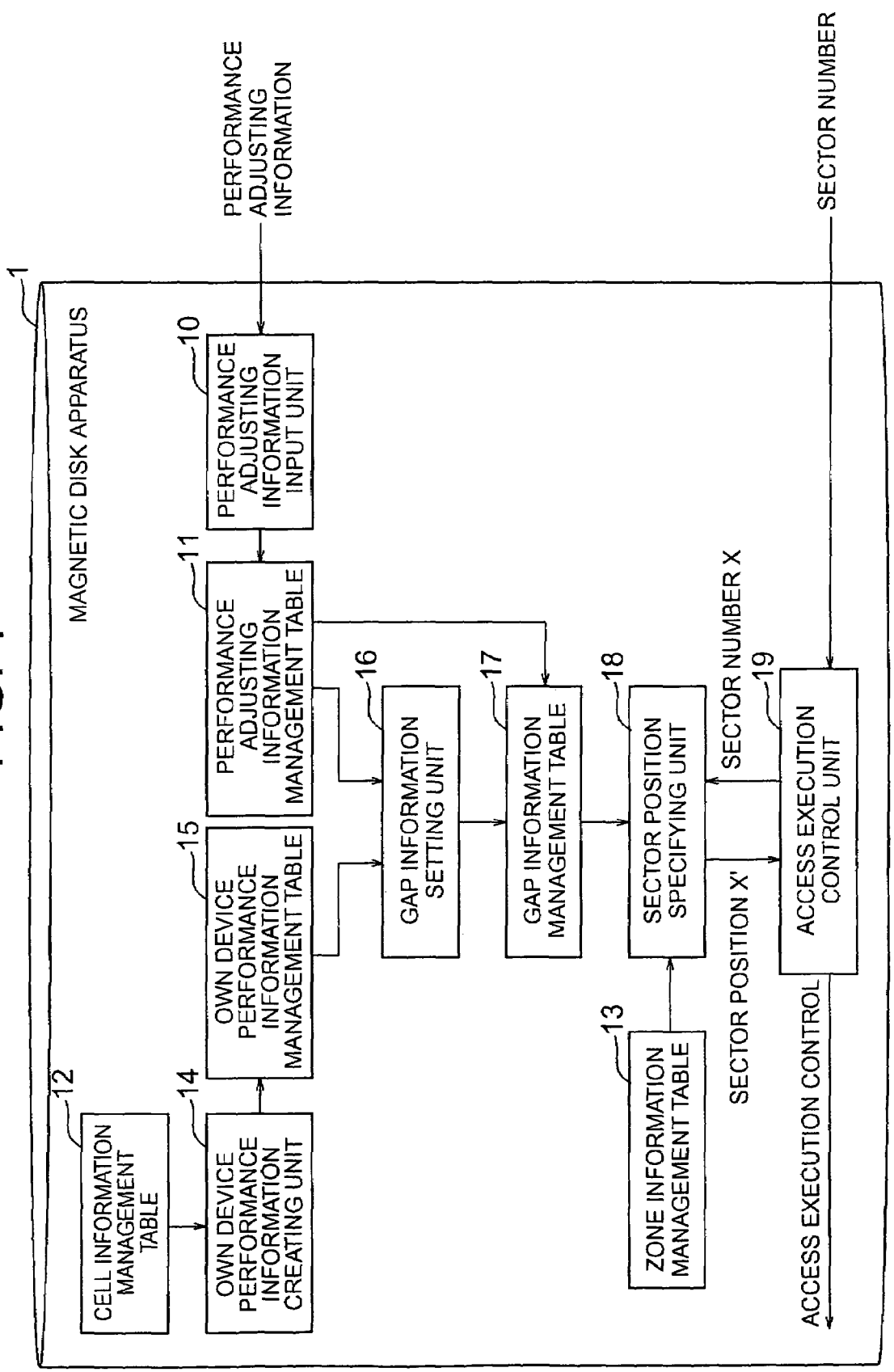
FIG. 1 is an embodiment of a magnetic disk apparatus according to the present invention.

FIG. 1 shows an embodiment of a magnetic disk apparatus 1 according to the present invention.

As shown in the figure, the magnetic disk apparatus 1 includes a performance adjusting information input unit 10, a performance adjusting information management table 11, a cell information management table 12, a zone information management table 13, an own device performance information creating unit 14, an own device performance information management table 15, a gap information setting unit 16, a gap information management table 17, a sector position specifying unit 18, and an access execution control unit 19.

Figures 2, 3:
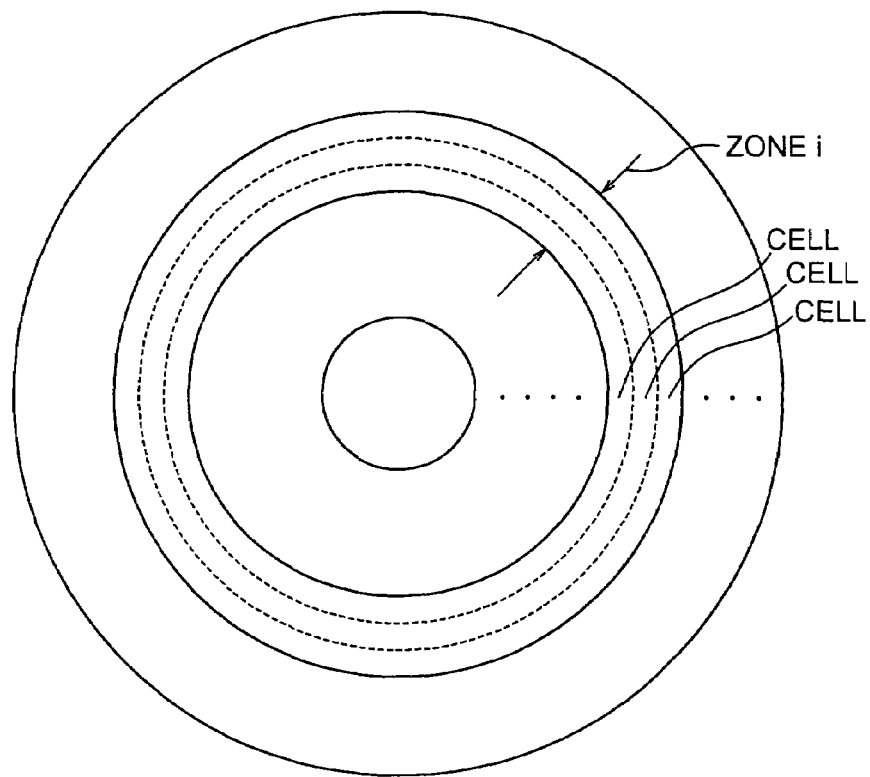
FIG. 2 is a diagram for explaining zones and cells that are set in a magnetic disk.
FIG. 3 is a diagram for explaining information that is managed by a performance adjusting information management table.

In the magnetic disk apparatus 1 of the present invention, as shown in FIG. 2 that is a view of a magnetic disk looked down from above, it is assumed that the magnetic disk is divided into a plurality of zones (smaller numbers are allocated to zones on the outer side) and each of the zones includes a plurality of cells (each of the cells includes a plurality of cylinders). It is also assumed that the cells belonging to an identical zone include the same number of sectors.

The performance adjusting information input unit 10 inputs performance adjusting information, and registers the performance adjusting information in the performance adjusting information management table 11. The performance adjusting information is inputted by a manufacturer of the magnetic disk apparatus 1, and is an information on the number of sectors that should be included in each cell belonging to each zone.

In response to the registration of the performance adjusting information, as shown in FIG. 3, the performance adjusting information management table 11 manages, in association with a zone number, information on the number of sectors that should be included in each cell belonging to the zone having the zone number.

The cell information management table 12 manages information on the number of cylinders for each magnetic head included in each cell belonging to each zone and the number of sectors per track. As shown in FIG. 4, the cell information management table 12 manages, in association with a zone number, information on the number of cylinders for each magnetic head included in each cell belonging to the zone having the zone number and information on the number of sectors per track.

The zone information management table 13 manages information on the number of cells belonging to each zone. As shown in FIG. 5, the zone information management table 13 manages, in association with a zone number, information on the number of cells belonging to the zone having the zone number. Note that, although all zones are formed by the identical number of cells in an example shown in FIG. 5, the number of cells may be different for each zone.

The own device performance information creating unit 14 calculates the number of sectors included in each cell using the information managed by the cell information management table 12 and registers the number of sectors in the own device performance information management table 15. In this embodiment, since it is assumed that the cells belonging to an identical zone include the same number of sectors, the own device performance information creating unit 14 calculates the number of sectors included in each cell by a unit of zone and registers the number of sectors in the own device performance information management table 15.

In response to the processing of the own device performance information creating unit 14, as shown in FIG. 6, the own device performance information management table 15 manages, in association with a zone number, information on the number of sectors included in each cell (the number of sectors actually included in the cell) belonging to the zone having the zone number.

Comparing table data managed by the performance adjusting information management table 11 shown in FIG. 3 with table data managed by the own device performance information management table 15 shown in FIG. 6, the following things are seen. That is, in order to realize the invention, for all magnetic disk apparatuses 1 to be manufactured, the number of sectors, which should be included in each cell and is defined by performance adjusting information inputted by a manufacturer of the magnetic disk apparatus 1, is set to be smaller than the number of sectors, which is actually included in each cell and is calculated by the own device performance information creating unit 14.

The gap information setting unit 16 sets the number of sectors, which is calculated as a difference between the number of sectors managed by the own device performance information management table 15 and the number of sectors managed by the performance adjusting information management table 11, as the number of unused sectors included in each cell (the number of unused sectors may be referred to as the number of gaps) and registers the number of unused sectors in the gap information management table 17. In this embodiment, since it is assumed that the cells belonging to an identical zone include the same number of sectors, the gap information setting unit 16 sets the number of unused sectors, which are included in each cell, by a unit of zone and registers the number of unused cells in the gap information management table 17.

The sectors as many as a number equivalent to the difference are set as unused sectors in order from a sector located at the end of the sectors belonging to each cell or from a sector located at the top. For example, as shown in FIG. 7, the sectors equivalent to the difference are set as unused sectors in order from a sector located at the end of the sectors belonging to each cell.

Figures 7, 8:
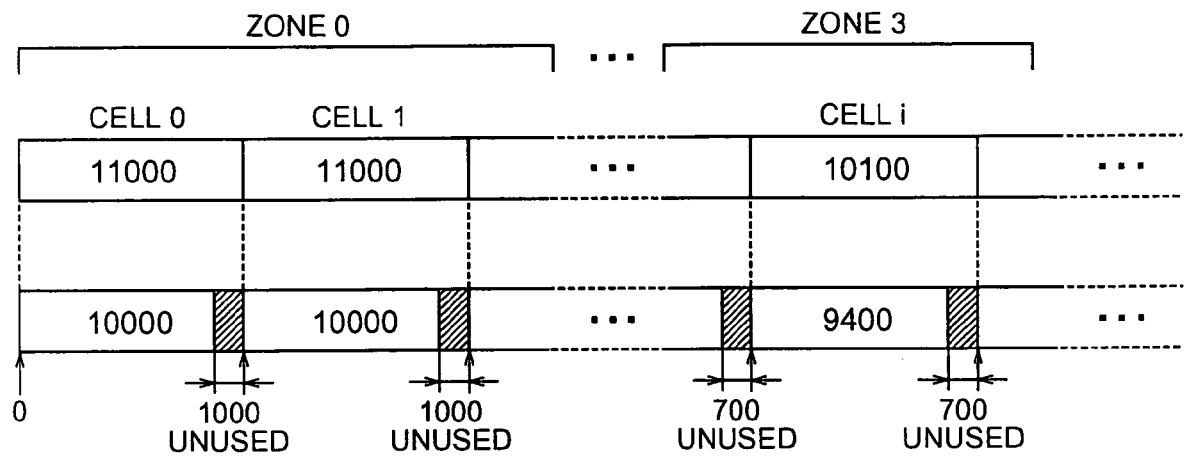
FIG. 7 is a diagram for explaining setting positions of unused sectors.
FIG. 8 is a diagram for explaining information managed by a gap information management table.

In response to the processing of the gap information setting unit 16, as shown in FIG. 8, the gap information management table 17 manages, in association with a zone number, information on unused sectors included in each cell belonging to a zone indicated by the zone number.

For example, when the number of sectors included in each cell belonging to a zone with a "zone number 1" managed by the own device performance information management table 15 is "11000" and the number of sectors, which should be included in each cell belonging to the zone, managed by the performance adjusting information management table 11 is "10000", the gap information management table 17 manages information indicating that the number of unused sectors included in each cell belonging to the zone with the "zone number 1" is "1000".

Figure 9:
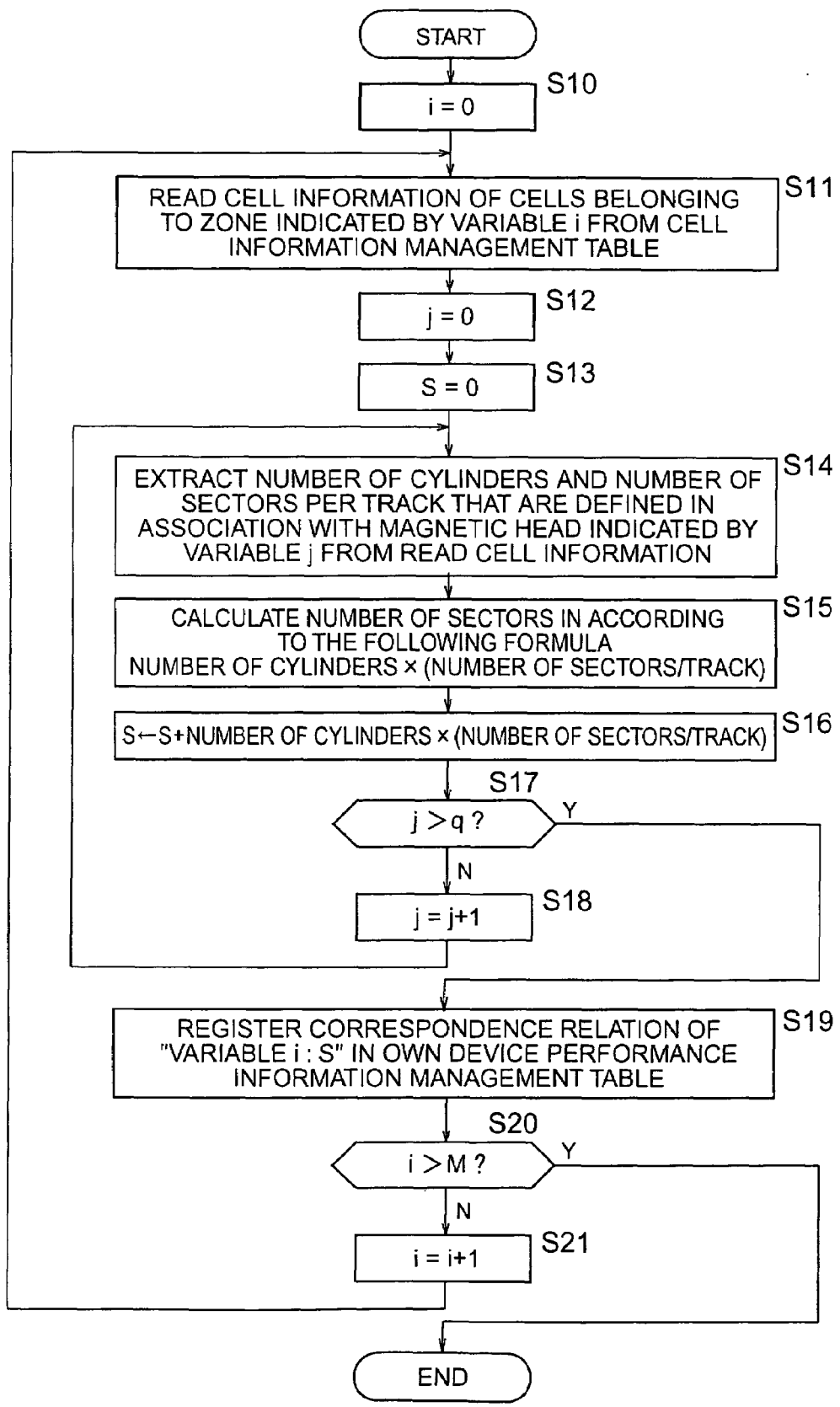
FIG. 9 is a flowchart of a processing flow executed by an own device performance information creating unit.
Figure 10:
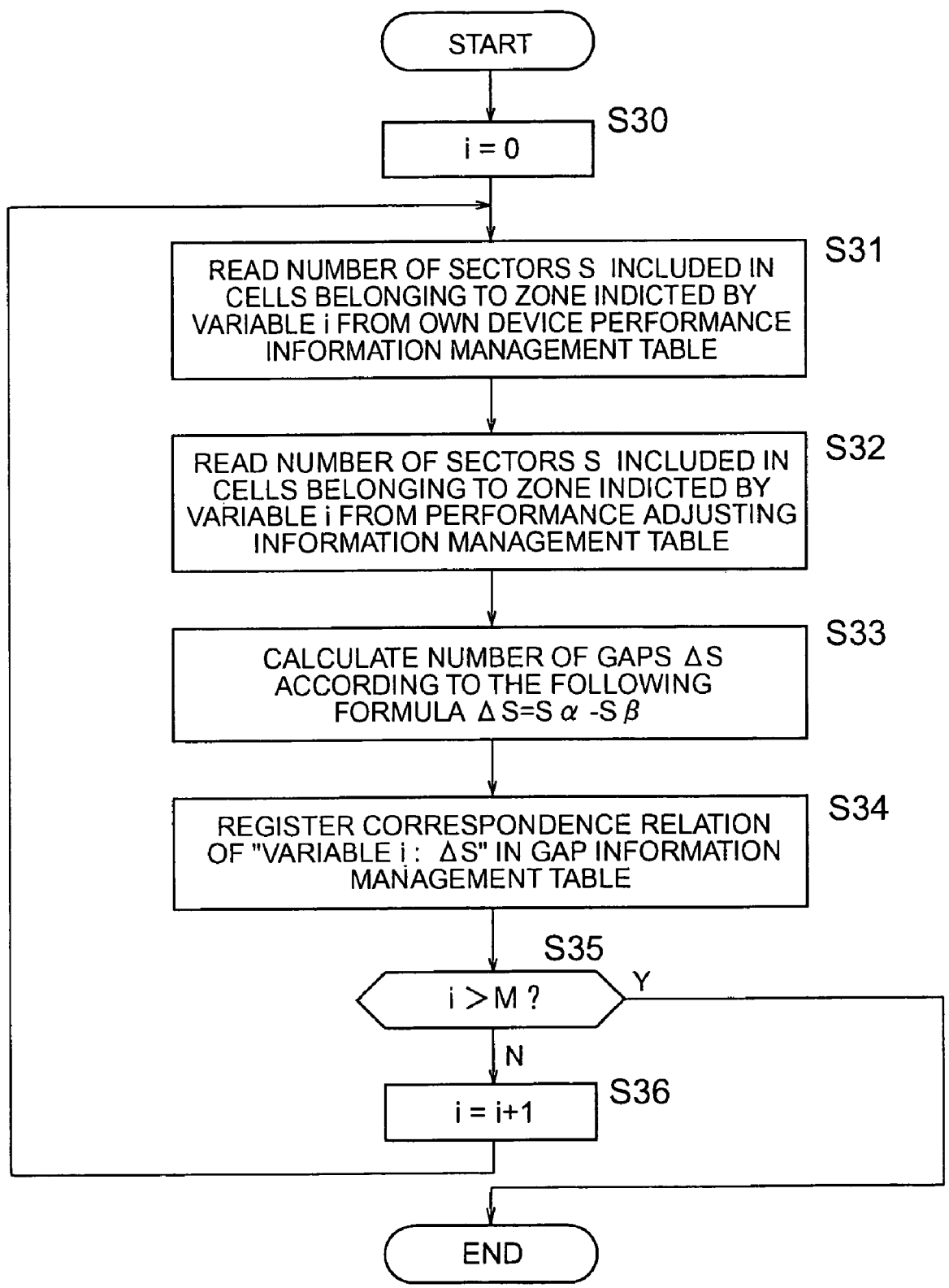
FIG. 10 is a flowchart of a processing flow executed by a gap information setting unit.
Figure 11:
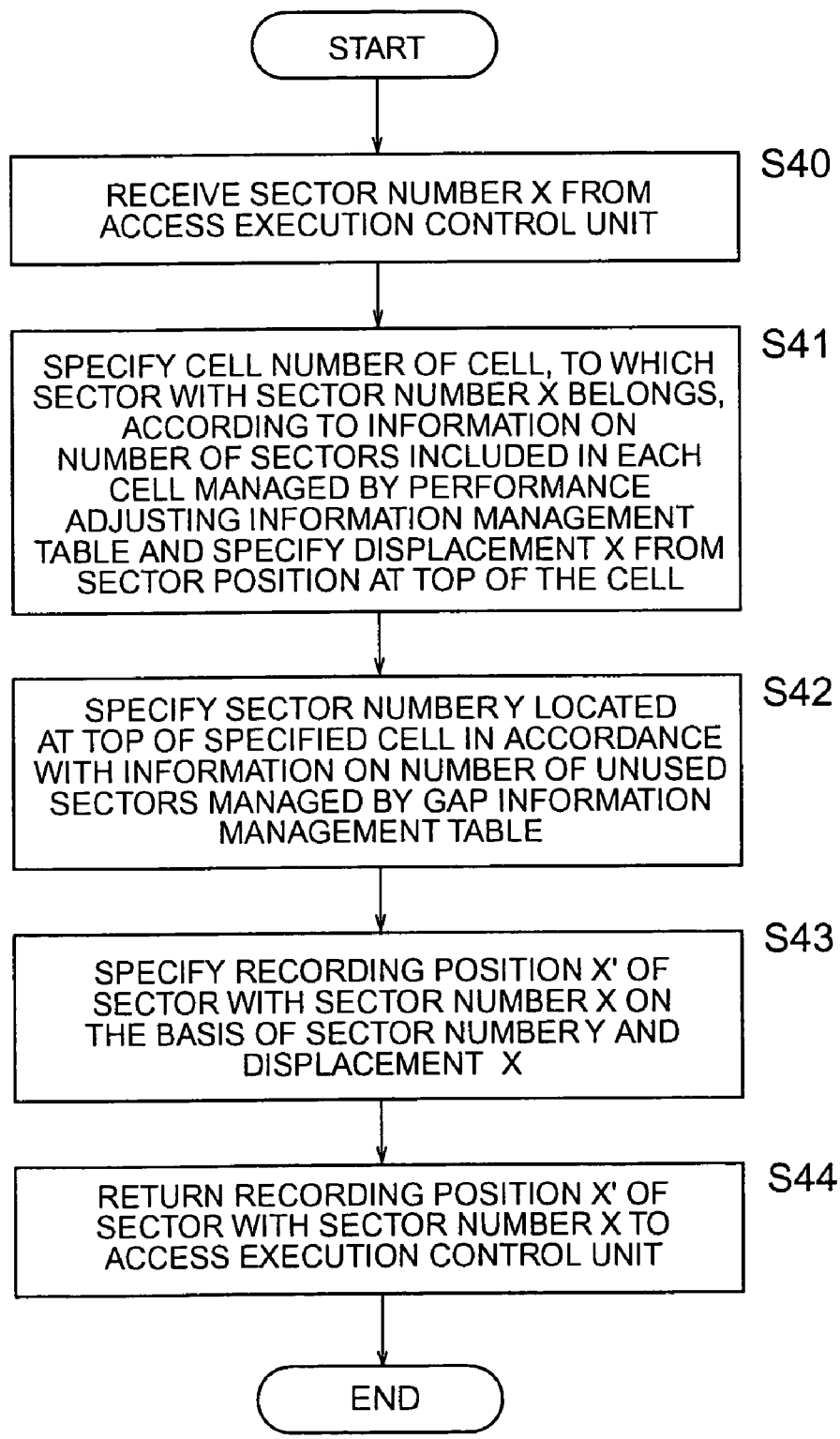
FIG. 11 is a flowchart of a processing flow executed by a sector position specifying unit.

FIG. 9 shows an example of a processing flow executed by the own device performance information creating unit 14. FIG. 10 shows an example of a processing flow executed by the gap information setting unit 16. FIG. 11 shows an example of a processing flow executed by the sector position specifying unit 18.

The own device performance information creating unit 14 executes the processing flow in FIG. 9 when the magnetic disk apparatus 1 is shipped from a factory. The gap information setting unit 16 executes the processing flow in FIG. 10 when the magnetic disk apparatus 1 is shipped from a factory. The sector position specifying unit 18 executes the processing flow in FIG. 11 when access to the magnetic disk apparatus 1 is requested actually.

Processing executed by the magnetic disk apparatus 1 of the present invention comprised as described above will be explained in detail with reference to these processing flows.

When the own device performance information creating unit 14 is activated, as shown in the processing flow in FIG. 9, in step S10, first, the own device performance information creating unit 14 sets an initial value "0" in a variable i indicating a zone number.

Subsequently, in step S11, the own device performance information creating unit 14 reads cell information of cells belonging to a zone indicated by the variable i from the cell information management table 12. For example, the own device performance information creating unit 14 reads cell information of cells belonging to a zone with a zone number 0 shown in FIG. 4.

In step S12, the own device performance information creating unit 14 sets an initial value "0" in a variable j indicating a magnetic head number. In step S13, the own device performance information creating unit 14 sets an initial value "0" in a variable S holding a sum of the numbers of sectors.

In step S14, the own device performance information creating unit 14 extracts the number of cylinders and the number of sectors per track defined in association with a magnetic head indicated by the variable j from the read cell information. In step S15, the own device performance information creating unit 14 multiplies the extracted number of cylinders by the extracted number of sectors per track. In step S16, the own device performance information creating unit 14 adds the multiplied value and the value of the variable S and substitutes the added value in the variable S.

In step S17, the own device performance information creating unit 14 judges whether a value of the variable j has exceeded q that is a maximum value of the magnetic head number. When it is judged that the value of the variable j has not exceeded q, the own device performance information creating unit 14 proceeds to step S18 and increments the value of the variable j by one. Then, the own device performance information creating unit 14 returns to step S14 in order to apply the processing to the next magnetic head.

The own device performance information creating unit 14 repeats steps S14 to S18 to calculate "the number of cylinders×(the number of sectors/track)" for each magnetic head and cumulatively adds the calculated value for the zone indicated by the variable i. When it is judged in step S17 that the value of the variable j has exceeded q that is the maximum value of the magnetic head number, the own device performance information creating unit 14 proceeds to step S19. And, the unit 14 registers a correspondence relation between a value of the variable i (representing a zone number) and the value of the variable S (representing the number of sectors included in each cell belonging to the zone having the zone number) in the own device performance information management table 15.

In step S20, the own device performance information creating unit 14 judges whether the value of the variable i has exceeded M that is a maximum value of the zone number. When it is judged that the value of the variable i has not exceeded M, the own device performance information creating unit 14 proceeds to step S21 and increments the value of the variable i by one. Then, the own device performance information creating unit 14 returns to step S11 in order to apply the processing to the next zone. When it is judged that the value of the variable i has exceeded M, the own device performance information creating unit 14 ends the processing.

In this way, the own device performance information creating unit 14 calculates the number of sectors included in each cell (the number of sectors actually included in the cell) using the information managed by the cell information management table 12, and registers the number of sectors in the own device performance information management table 15.

On the other hand, as described above, the performance adjusting information input unit 10 inputs performance adjusting information that is information on the number of sectors, which should be included in each cell belonging to each zone and is inputted by a manufacturer of the magnetic disk apparatus 1, and registers the performance adjusting information in the performance adjusting information management table 11.

In this way, the information on the number of sectors included in each cell belonging to each zone is registered in the own device performance information management table 15, and the information on the number of sectors, which should be included in each cell belonging to each zone, is registered in the performance adjusting information management table 11. After these registering, the gap information setting unit 16 is activated.

When the gap information setting unit 16 is activated, as indicated by the processing flow in FIG. 10, first, in step S30, the gap information setting unit 16 sets an initial value "0" in the variable i indicating a zone number.

Subsequently, in step S31, the gap information setting unit 16 reads the number of sectors included in cells belonging to a zone indicated by the variable i from the own device performance information management table 15 (for convenience of explanation, the number of sectors is set as $S\alpha$). In step S32, the gap information setting unit 16 reads the number of sectors included in the cells belonging to the zone indicated by the variable i from the performance adjusting information management table 11 (for convenience of explanation, the number of sectors is set as $S\beta$).

In step S33, the gap information setting unit 16 calculates a difference $\Delta S$ between the number of sectors $S\alpha$ and the number of sectors $S\beta$, which is a number of gaps of the cells belonging to the zone indicated by the variable i. In step S34, the gap information setting unit 16 registers a correspondence relation between the value of the variable i (representing the zone number) and the value of ΔS (representing the number of unused sectors included in each cell belonging to the zone having the zone number).

In step S35, the gap information setting unit 16 judges whether the value of the variable i has exceeded M that is the maximum value of the zone number. When it is judged that the value of the variable i has not exceeded M, the gap information setting unit 16 proceeds to step S36 and increments the value of the variable i by one. Then, the gap information setting unit 16 returns to step S31 in order to perform the processing for the next zone. When it is judged that the value of the variable i has exceeded M, the gap information setting unit 16 ends the processing.

In this way, the gap information setting unit 16 sets the number of sectors, which is calculated as a difference between the number of sectors managed by the performance adjusting information management table 11 and the number of sectors managed by the own device performance information management table 15, as the number of unused sectors included in each cell, and registers the number of unused sectors in the gap information management table 17.

When information on the number of unused sectors included in each cell is registered in the gap information management table 17 by the gap information setting unit 16, manufacturing of the magnetic disk apparatus 1 is completed and the magnetic disk apparatus 1 is shipped to a user.

Processing executed by the sector position specifying unit 18 will be explained with reference to the processing flow in FIG. 11.

When an access request is issued from a not-shown host computer designating a sector number, the access execution control unit 19 inquires of the sector position specifying unit 18 in which recording position a sector indicated by the sector number is located.

In response to this inquiry, as shown in the processing flow in FIG. 11, first, in step S40, the sector position specifying unit 18 receives from the access execution control unit 19 the sector number indicated by the host computer in the access request (for convenience of explanation, the sector number is set as X).

Subsequently, in step S41, the sector position specifying unit 18 specifies a cell number of a cell, to which a sector with the sector number X belongs, according to the information on the number of sectors included in each cell managed by the performance adjusting information management table 11. In addition, in a case that unused sectors are set in order from a sector located at the end, the sector position specifying unit 18 specifies a displacement ΔX (a displacement of a sector number) from a top sector position. The displacement ΔX indicates in which sector position in the specified cell the sector with the sector number X is located.

Figure 12:
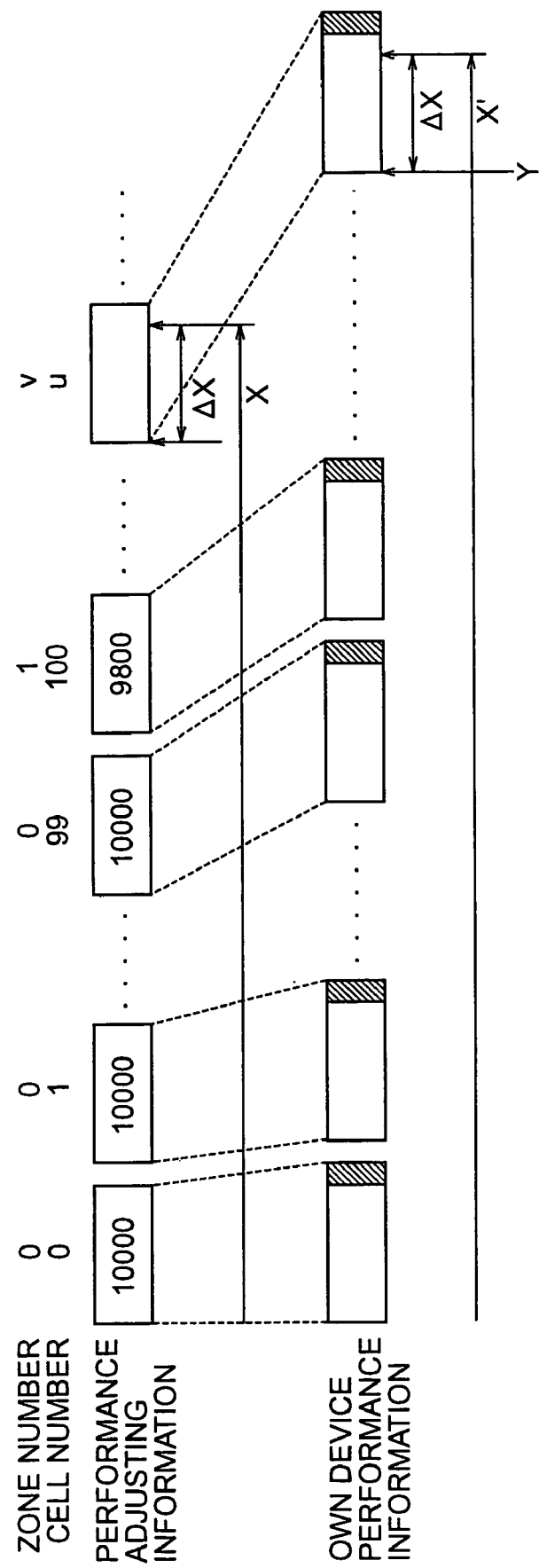
FIG. 12 is a diagram for explaining processing executed by the sector position specifying unit.

In other words, as shown in FIG. 12, the sector position specifying unit 18 specifies a cell number u of the cell to which the sector with the sector number X belongs, and specifies the displacement ΔX from the top sector position of the cell. Note that, when unused sectors are set in order from a sector located at the top, the sector position specifying unit 18 specifies the displacement ΔX from a sector position of an unused sector located at the end.

As shown in FIG. 3, the performance adjusting information management table 11 manages information on the number of sectors, which should be included in each cell, by a unit of zone (in the case of this embodiment, information on the number of sectors included in each cell). Thus, in specifying this cell number, the sector position specifying unit 18 refers to the information on the number of cells belonging to each zone managed by the zone information management table 13.

In step S42, the sector position specifying unit 18 specifies a sector number located at the top of the cell specified in step S41 (for convenience of explanation, the sector number is set as Y), taking into account the information on the number of unused cells included in each cell managed by the gap information management table 17.

In other words, as shown in FIG. 12, the sector position specifying unit 18 specifies the sector number Y located at the top of the cell, to which the sector with the sector number X belongs, taking into account the information on the number of unused sectors included in each cell managed by the gap information management table 17.

As shown in FIG. 8, the gap information management table 17 manages the information on the number of unused sectors included in each cell by a unit of zone. Thus, in specifying the sector number Y, the sector position specifying unit 18 refers to the information on the number of cells belonging to each zone managed by the zone information management table 13.

In step S43, the sector position specifying unit 18 specifies a recording position X' of the sector with the sector number X on the basis of the sector number Y specified in step S42 and the displacement ΔX specified in step S41.

In other words, as shown in FIG. 12, the sector position specifying unit 18 specifies the recording position X' of the sector with the sector number X by adding the displacement ΔX to the sector number Y.

In step S44, the sector position specifying unit 18 returns the specified recording position X' of the sector with the sector number X to the access execution control unit 19, and ends the processing.

In this way, the magnetic disk apparatus 1 adjusts the number of sectors included in each cell of the own device uniformly to the number of sectors defined in the performance adjusting information. Thus, even when a plurality of the magnetic disk apparatuses of the present invention having the same storage capacity as specifications are manufactured, in the magnetic disk apparatuses 1, the numbers of sectors of cells are adjusted to the number of sectors defined in the performance adjusting information to make the numbers of cells identical. Consequently, uniformalization of data access times can be realized.

[2] Second Embodiment

FIG. 13 shows the magnetic disk apparatus 1 according to another embodiment of the invention. Components same as those shown in FIG. 1 are denoted by the identical reference numerals and signs.

In this embodiment, the magnetic disk apparatus 1 includes a used/unused sector information setting unit 20 instead of the gap information setting unit 16 included in the magnetic disk apparatus 1 in the first embodiment shown in FIG. 1. In addition, the magnetic disk apparatus 1 includes a used/unused sector information management table 21 instead of the gap information management table 17 included in the magnetic disk apparatus 1 in the first embodiment shown in FIG. 1. Moreover, the magnetic disk apparatus 1 newly includes a management table for gap correction 22.

Note that, since the used/unused sector information management table 21 is included in the magnetic disk apparatus 1 instead of the gap information management table 17, the sector position specifying unit 18 executes processing matching the used/unused sector information management table 21.

For example, as shown in FIG. 14A, in the case of an access error occurrence rate shown in FIG. 14A, the management table for gap correction 22, which is newly included in the magnetic disk apparatus 1 in this embodiment, manages information on how many used sectors included in each cell should be added to the number of sectors defined by performance adjusting information. As shown in FIG. 14B, when the number of magnetic heads is reduced to the number shown in the figure, the management table for gap correction 22 manages information on how many used sectors included in each cell should be added to the number of sectors defined by the performance adjusting information.

As shown in FIG. 15, the used/unused sector information management table 21, which is included in the magnetic disk apparatus 1 instead of the gap information management table 17 in this embodiment, manages information on the number of used sectors included in each cell belonging to each zone and information on the number of unused sectors. For example, the used/unused sector information management table 21 manages information indicating that the number of used sectors included in each cell belonging to a zone with a zone number 0 is "10050" and the number of unused sectors is "950".

Sectors are set as the unused sectors in order from a sector located at the end of sectors belonging to each cell or a sector located at the top. For example, as shown in FIG. 7, sectors are set as the unused sectors in order from a sector located at the end of sectors belonging to each cell.

In this embodiment, again, it is assumed that cells belonging to an identical zone include the same number of sectors. Accordingly, the used/unused sector information management table 21 manages information on the number of used sectors included in each cell and information on the number of unused sectors by a unit of zone.

Figure 16:
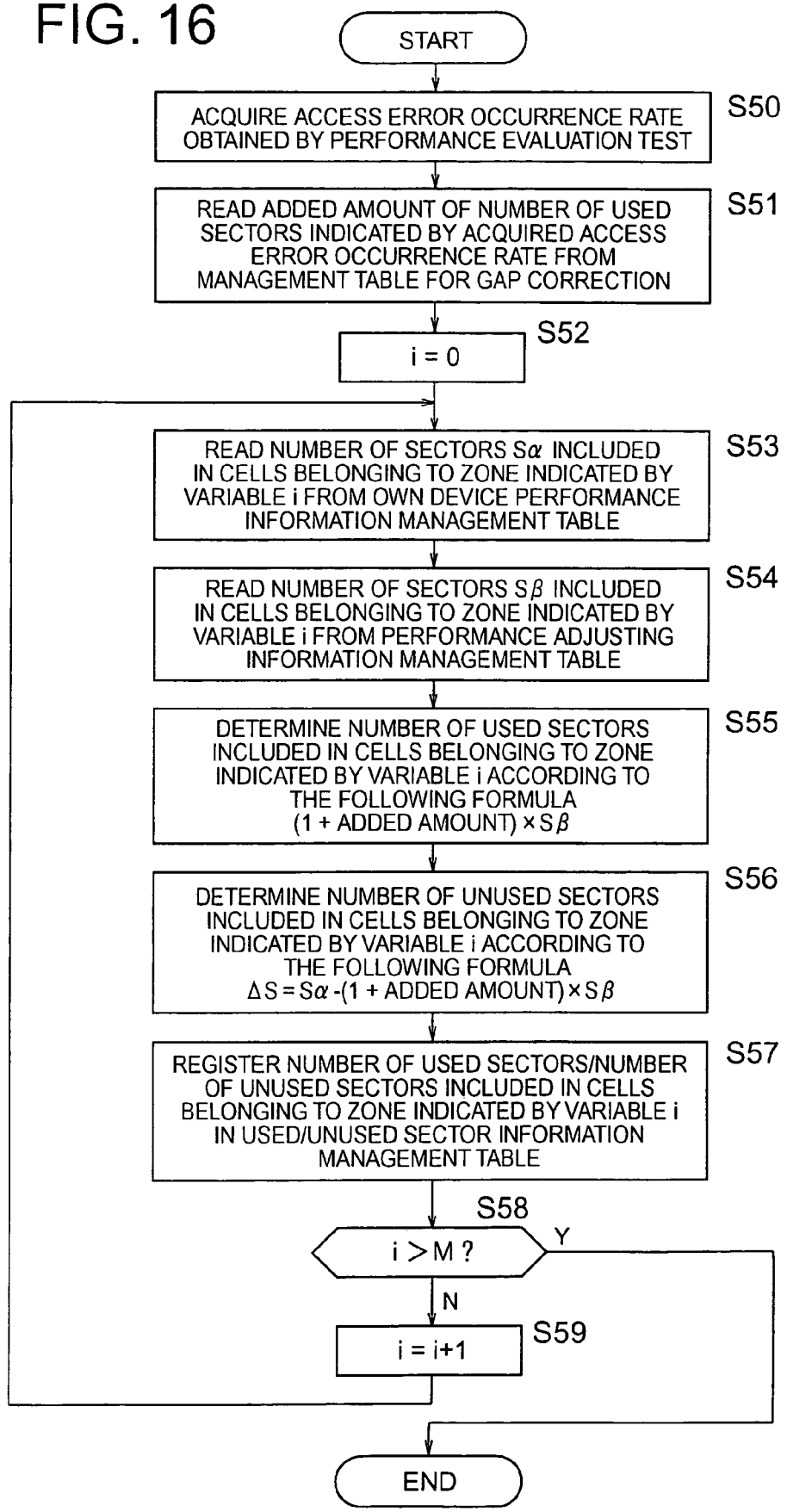
FIG. 16 is a flowchart of a processing flow executed by a used/unused sector information setting unit.

FIG. 16 shows an example of a processing flow executed by the used/unused sector information setting unit 20. FIG. 17 shows an example of a processing flow executed by the sector position specifying unit 18 in this embodiment.

The used/unused sector information setting unit 20 executes the processing flow in FIG. 16 when the magnetic disk apparatus is shipped from a factory. The sector position specifying unit 18 executes the processing flow in FIG. 17 when access to the magnetic disk apparatus is requested actually. In the processing flow in FIG. 16, it is assumed that the management table for gap correction 22 manages the information shown in FIG. 14A (an amount to be added is defined in percentage).

Processing executed by the magnetic disk apparatus 1 comprised as described above will be explained in detail with reference to the processing flows.

According to the processing described above, the information on the number of sectors included in each cell belonging to each zone is registered in the own device performance information management table 15, and the information on the number of sectors, which should be included in each cell belonging to each zone, is registered in the performance adjusting information management table 11. After these registering, the used/unused sector information setting unit 20 is activated.

When the used/unused sector information setting unit 20 is activated in this way, as shown in the processing flow in FIG. 16, first, in step S50, the used/unused sector information setting unit 20 acquires an access error occurrence rate (an access error occurrence rate of the own device) obtained by a performance evaluation test performed on the own device.

Subsequently, in step S51, the used/unused sector information setting unit 20 reads an added amount of the number of used sectors indicated by the acquired access error occurrence rate from the management table for gap correction 22.

In step S52, the used/unused sector information setting unit 20 sets an initial value "0" in the variable i indicating a zone number.

In step S53, the used/unused sector information setting unit 20 reads the number of sectors included in cells belonging to the zone indicated by the variable i (for convenience of explanation, the number sectors is referred to as $S\alpha$) from the own device performance information management table 15. In step S54, the used/unused sector information setting unit 20 reads the number of sectors included in the cells belonging to the zone indicated by the variable i (for convenience of explanation, the number of sectors is referred to as $S\beta$) from the performance adjusting information management table 11.

In step S55, the used/unused sector information setting unit 20 calculates "(1+ the added amount)$\times S\beta$" according to the read number of sectors $S\beta$ and the added amount read in step S51, and determines a number of used sectors included in the cells belonging to the zone indicated by the variable i.

In other words, in this embodiment, the number of sectors increased according to an access error occurrence rate is determined as the number of used sectors rather than directly determining the number of sectors defined by the performance adjusting information as the number of used sectors.

In step S56, the used/unused sector information setting unit 20 calculates "$S\alpha-(1+$ the added amount)$\times S\beta$" according to the number of sectors $S\alpha$ read in step S53 and the determined number of used sectors.

In step S57, the used/unused sector information setting unit 20 registers information on the number of used sectors included in the cells belonging to the zone indicated by the variable i determined in step S55, and information on the number of unused sectors included in the cells belonging to the zone indicated by the variable i determined in step S56 in the used/unused sector information management table 21.

In step S58, the used/unused sector information setting unit 20 judges whether a value of the variable i has exceeded M that is the maximum value of the zone number. When it is judged that the value of the variable i has not exceeded M, the unit 20 proceeds to step S59 and increments the value of the variable i by one. Then, the unit 20 returns to step S53 in order to apply the processing to the next zone. When it is judged that the value of the variable i has exceeded M, the unit 20 ends the processing.

In this way, the used/unused sector information setting unit 20 increases the number of sectors managed by the performance adjusting information management table 11 according to an access error occurrence rate, sets the increased number of sectors as the number of used sectors included in cells, registers the number of used sectors in the used/unused sector information management table 21, and sets the number of remaining sectors as the number of unused sectors included in the cells and registering the number of unused sectors in the used/unused sector information management table 21.

When the information on the number of used sectors included in each cell and the information on the number of unused sectors are registered in the used/unused sector information management table 21 by the used/unused sector information setting unit 20, manufacturing of the magnetic disk apparatus 1 is completed and the magnetic disk apparatus 1 is shipped to a user.

Processing executed by the sector position specifying unit 18 in this embodiment will be explained with reference to a processing flow in FIG. 17.

When an access request is issued from a not-shown host computer designating a sector number, the access execution control unit 19 inquires of the sector position specifying unit 18 in which recording position a sector indicated by the sector number is located.

In response to this inquiry, as shown in the processing flow in FIG. 17, first, in step S60, the sector position specifying unit 18 receives from the access execution control unit 19 the sector number designated by the host computer in the access request (for convenience of explanation, the sector number is set as X).

Subsequently, in step S61, the sector position specifying unit 18 specifies a cell number of a cell, to which a sector with the sector number X belongs, according to the information on the number of used sectors included in each cell managed by the used/unused sector information management table 21. In addition, in a case that unused sectors are set in order from a sector located at the end, the sector position specifying unit 18 specifies a displacement $\Delta X$ (a displacement of a sector number) from a top sector position indicating in which sector position in the specified cell the sector with the sector number X is located.

As shown in FIG. 15, the used/unused sector information management table 21 manages information on the number of used sectors included in each cell by a unit of zone. Thus, in specifying this cell number, the sector position specifying unit 18 refers to the information on the number of cells belonging to each zone managed by the zone information management table 13.

In step S62, the sector position specifying unit 18 specifies a sector number located at the top of the cell specified in step S61 (for convenience of explanation, the sector number is set as Y), taking into account the information on the number of unused cells included in each cell managed by the used/unused sector information management table 21.

As shown in FIG. 15, the used/unused sector information management table 21 manages the information on the number of unused sectors included in each cell by a unit of zone. Thus, in specifying the sector number Y, the sector position specifying unit 18 refers to the information on the number of cells belonging to each zone managed by the zone information management table 13.

In step S63, the sector position specifying unit 18 specifies a recording position X' of the sector with the sector number X by adding the displacement $\Delta X$ to the sector number Y, on the basis of the sector number Y specified in step S62 and the displacement $\Delta X$ specified in step S61.

In step S64, the sector position specifying unit 18 returns the specified recording position X' of the sector with the sector number X to the access execution control unit 19 and ends the processing.

In this way, in this embodiment, the magnetic disk apparatus 1 acquires information on an added amount of the number of used sectors corresponding to an access error occurrence rate obtained by an evaluation test for the apparatus, and sets the number of used sectors and the number of unused sectors for each cell by increasing the number of used sectors defined by performance adjusting information according to the acquired added amount.

According to this structure, when the access error occurrence rate is large, the number of cells is reduced by increasing the number of sectors included in each cell of the own device, whereby a seek amount is reduced. This makes it possible to restrain an increase in seek time based on an increase of the number of times of seek due to the large access error occurrence rate to realize uniformalization of data access times.

In this embodiment, it is assumed that an access error occurrence rate can be acquired in a form of an access error occurrence rate of the entire device. However, when an access error occurrence rate can be acquired in a form of an access error occurrence rate for each zone, that is, an access error occurrence rate for each cell, processing is performed to change an added amount of the number of used sectors for each cell.

In addition, in this embodiment, it is assumed that the management table for gap correction 22 manages the information shown in FIG. 14A. However, the present invention is also applicable to the case in which the management table for gap correction 22 manages the information shown in FIG. 14B.

In this case, for example, when the magnetic disk apparatus is manufactured as a device with a small storage capacity while defective magnetic heads are mounted thereon, the number of cells is reduced by increasing the number of sectors included in each cell of the own device, whereby a seek amount is reduced. This makes it possible to restrain an increase in seek time based on an increase in seek movement speed due to heavy magnetic heads to realize uniformalization of data access times.

What is claimed is:

1. A magnetic disk apparatus that can change the number of sectors included in each cell set on a magnetic disk, the apparatus comprising:

an inputting unit for inputting information on the number of sectors, which should be included in each cell, defined as performance adjusting information;

a calculating unit for calculating, for each cell, the number of sectors included in the cell on the basis of constitution information of cells; and a setting unit for setting sectors as many as a number, which is equivalent to a difference between the number of sectors calculated by the calculating unit and the number of sectors inputted by the input unit, as unused sectors.

2. The magnetic disk apparatus according to claim 1, wherein the setting unit sets sectors as many as a number equivalent to the difference as unused sectors in order from a sector located at the end of sectors belonging to each cell or a sector located at the top.

3. The magnetic disk apparatus according to claim 1, wherein the calculating unit calculates the number of sectors included in each cell on the basis of constitution information of cells describing the number of cylinders for each magnetic head and the number of sectors per track.

4. The magnetic disk apparatus according to claim 1, further comprising:

an acquiring unit for acquiring, according to an error occurrence rate of magnetic disk access obtained by an evaluation test for the apparatus, information on an added number of sectors defined in association with the error occurrence rate, wherein the setting unit sets sectors, which are not to be used, to reduce the difference according to the information on an added number of sectors acquired by the acquiring unit.

5. The magnetic disk apparatus according to claim 4, wherein the acquiring unit acquires, according to an error occurrence rate of magnetic disk access for each cell obtained by an evaluation test for the apparatus, information on an added number of sectors for each cell defined in association with the error occurrence rate.

6. The magnetic disk apparatus according to claim 1, further comprising:
an acquiring unit for acquiring, according to a structure of hardware used for magnetic disk access, information on an added number of sectors defined in association with the structure,
wherein the setting unit sets sectors, which are not to be used, to reduce the difference according to the information on an added number of sectors acquired by the acquiring unit.

7. The magnetic disk apparatus according to claim 6, wherein the acquiring unit acquires, according to the number of magnetic heads, information on an added number of sectors defined in association with the number of magnetic heads.

8. A method for adjusting performance of a magnetic disk apparatus, the method being executed by magnetic disk apparatuses, which can change the number of sectors included in each cell set on a magnetic disk, to uniformalize access times of the magnetic disk apparatuses, the method comprising:
inputting information on the number of sectors, which should be included in each cell, defined as performance adjusting information;
calculating, for each cell, the number of sectors included in the cell on the basis of constitution information of cells; and
setting, for each cell, sectors as many as a number equivalent to a difference between the number of sectors calculated by the calculating unit and the number of sectors inputted by the inputting unit as unused sectors.

9. A computer readable medium recording a magnetic disk apparatus performance adjusting program used by magnetic disk apparatuses, which can change the number of sectors included in each cell set on a magnetic disk, to execute processing for uniformalizing access times of the magnetic disk apparatuses, the program causing a computer to execute:
inputting information on the number of sectors, which should be included in each cell, defined as performance adjusting information;
calculating, for each cell, the number of sectors included in the cell on the basis of constitution information of cells; and
setting, for each cell, sectors as many as a number, which is equivalent to a difference between the number of sectors calculated by the calculating unit and the number of sectors inputted by the inputting unit, as unused sectors.

10. A magnetic disk apparatus that can change the number of sectors included in each cell set on a magnetic disk, the apparatus comprising:
first storing unit for storing information on the number of sectors, which should be included in each cell, defined as performance adjusting information;
second storing unit for storing information on the number of unused sectors included in each cell that is determined according to the number of sectors defined by the performance adjusting information;
an input unit for inputting a sector number designated by an access request; and
a specifying unit for specifying, on the basis of the information stored by the first and the second storing unit, recording position of a sector indicated by the sector number inputted by the input unit.

11. The magnetic disk apparatus according to claim 10, wherein the second storing unit stores displacement information as the information on the number of unused sectors included in each cell, and the displacement information is a number of sectors which are to be set as the unused sectors and are located in order at an end of each cell or at a top of each cell.

12. A magnetic disk apparatus that can change the number of sectors included in each cell set on a magnetic disk, the apparatus comprising:
a storing unit for storing information on the number of used sectors, which are included in each cell, determined on the basis of performance adjusting information defining the number of sectors that should be included in each cell and information on the number of unused sectors included in each cell determined according to the number of used sectors;
an input unit for inputting a sector number designated by an access request; and
a specifying unit for specifying, on the basis of the information stored by the first and the second storing unit, recording position of a sector indicated by the sector number inputted by the input unit.

13. The magnetic disk apparatus according to claim 12, wherein the storing unit stores displacement information as the information on the number of unused sectors included in each cell that are set as unused sectors in order from a sector located at the end of sectors belonging to each cell or a sector located at the top, and the displacement information is a number of sectors which are to be set as the unused sectors and are located in order at an end of each cell or at a top of each cell.

14. A method for accessing a magnetic disk, the method being executed by magnetic disk apparatuses that can change the number of sectors included in each cell set on a magnetic disk to access the magnetic disks, the method comprising:
inputting a sector number designated by an access request; and
specifying, on the basis of information stored in a first storing unit for storing information on the number of sectors, which should be included in each cell, defined as performance adjusting information and information stored in a second storing unit for storing information on the number of unused sectors included in each cell determined according to the number of sectors defined by the performance adjusting information, recording position of a sector indicated by the inputted sector number.

15. A computer readable medium recording a magnetic disk access program used by magnetic disk apparatuses, which can change the number of sectors included in each cell set on a magnetic disk, to execute processing for accessing the magnetic disk apparatuses, the program causing a computer to execute:
inputting a sector number designated by an access request; and
specifying, on the basis of information stored in first storing unit that stores information on the number of sectors, which should be included in each cell, defined as performance adjusting information and information stored in second storing unit that stores information on the number of unused sectors included in each cell determined according to the number of sectors defined by the performance adjusting information, recording position of a sector indicated by the inputted sector number.

16. A method for accessing a magnetic disk, the method being executed by magnetic disk apparatuses, which can change the number of sectors included in each cell set on a magnetic disk, to access the magnetic disks, the method comprising:

inputting a sector number designated by an access request; and specifying, on the basis of information on the number of used sectors included in each cell determined on the basis of performance adjusting information defining the number of sectors, which should be included in each cell, and information stored in storing unit that stores information on the number of unused sectors included in each cell determined according to the number of used sectors, recording position of a sector indicated by the inputted sector number.

17. A computer readable medium recording a magnetic disk access program used by magnetic disk apparatuses, which can change the number of sectors included in each cell set on a magnetic disk, to execute processing for accessing the magnetic disk apparatuses, the program causing a computer to execute:

inputting a sector number designated by an access request; and specifying, on the basis of information on the number of used sectors included in each cell determined on the basis of performance adjusting information defining the number of sectors, which should be included in each cell, and information stored in storing unit that stores information on the number of unused sectors included in each cell determined according to the number of used sectors, recording position of a sector indicated by the inputted sector number.

\* \* \* \* \*